United States Patent
Tateishi

(10) Patent No.: US 6,198,085 B1
(45) Date of Patent: Mar. 6, 2001

(54) REPEAT CONTROL APPARATUS, INFORMATION REPRODUCING APPARATUS AND INFORMATION RECORDING APPARATUS

(75) Inventor: Kiyoshi Tateishi, Tsurugashima (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/219,778

(22) Filed: Dec. 23, 1998

(30) Foreign Application Priority Data

Dec. 24, 1997 (JP) .................................................. 9-354521

(51) Int. Cl.$^7$ ........................................................ G11B 7/00
(52) U.S. Cl. ..................................... 250/201.5; 369/44.32; 369/44.41
(58) Field of Search .............................. 205/201.1, 201.2, 205/201.4, 201.5, 214 R; 369/44.11, 44.25, 44.26, 44.29, 44.32, 44.34, 44.41, 48

(56) References Cited

U.S. PATENT DOCUMENTS 5,617,389 * 4/1997 Satoh et al. ........................ 250/201.5

* cited by examiner

*Primary Examiner*—John R. Lee
*Assistant Examiner*—Kevin Pyo
(74) *Attorney, Agent, or Firm*—Morgan, Lewis & Bockius LLP

(57) ABSTRACT

A repeat control apparatus is installed in an information reproducing apparatus. The repeat control apparatus performs a repeat control on a control signal. The control signal includes control information to be used for controlling reproduction of recording information from a recording medium. The control signal is generated by using a light beam reflected by the recording medium. The repeat control apparatus has: a storage device for storing the control signal; a detecting device for detecting a damaged part of the control signal; a generating device for generating a compensation signal to compensate the damaged part of the control signal; a storing control device for storing the compensation signal, instead of the damaged part of the control signal, into the storage device; and a repeat control device for performing the repeat control by using the control signal and the compensation signal stored in the storage device.

14 Claims, 11 Drawing Sheets

FIG.10

| adr | X | Y |
|---|---|---|
| 1 | | |
| 2 | | |
| 3 | | |
| 4 | | |
| ⋮ | | |
| 34 | | |
| 35 | | |
| 36 | | |

40 — X column
41 — Y column
33

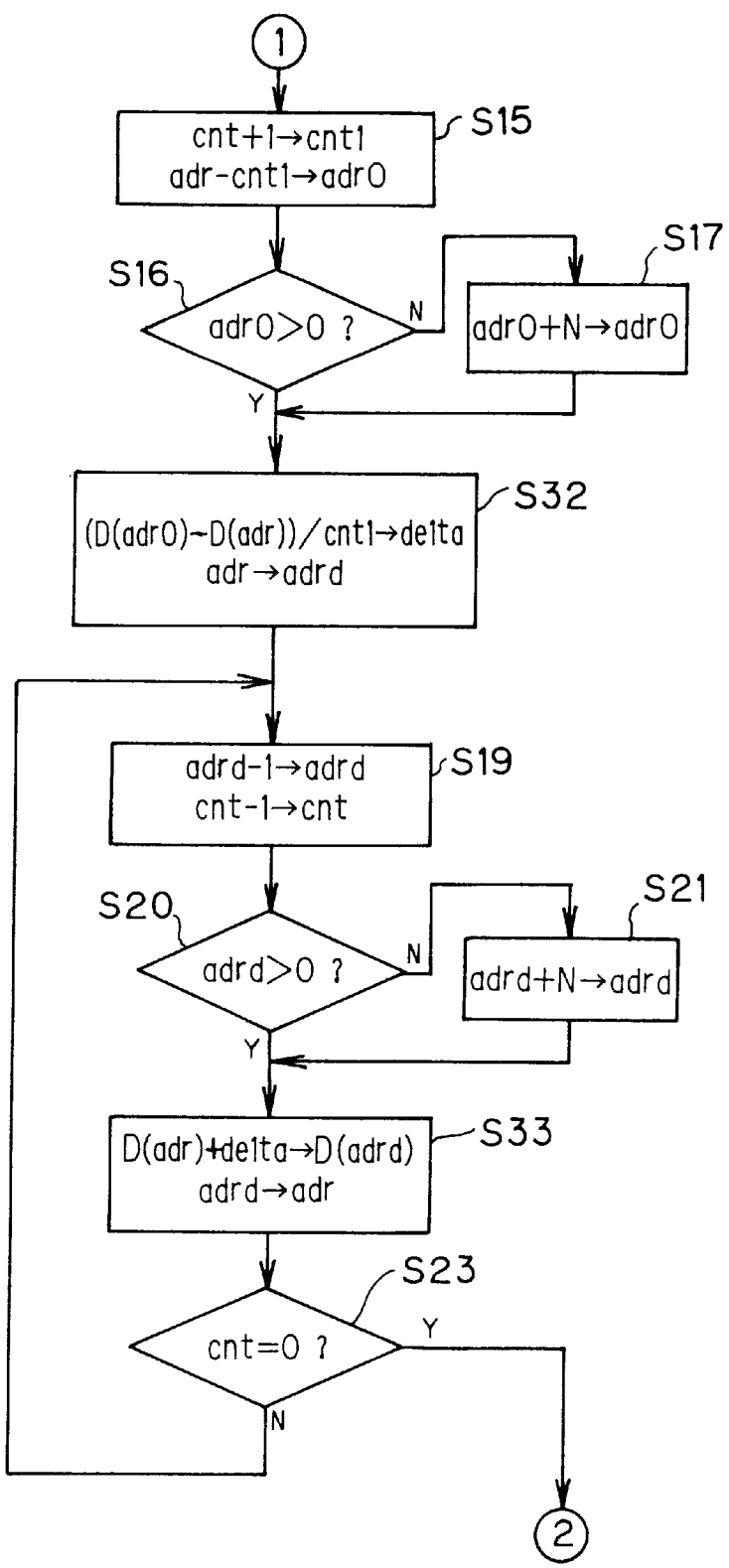

REPEAT CONTROL APPARATUS, INFORMATION REPRODUCING APPARATUS AND INFORMATION RECORDING APPARATUS

BACKGROUND OF THE INVENTION

1. Field of the Invention

The present invention relates to a repeat control apparatus to be adapted to an information reproducing apparatus for reproducing information recorded on an optical disk or an information recording apparatus for recording information onto an optical disk.

2. Description of the Related Art

A repeat control technique is used in various technical fields for the purpose of improving accuracy of control processes.

The repeat control is preferably used for a control system wherein its input signal has a cyclical wave form. The repeat control depends on the periodicity of the input signal. In the repeat control, deviation at the previous cycle is reflected in a control operation at the present cycle.

FIG. 1 shows a basic circuit of the repeat control. In FIG. 1, the basic circuit 300 has a repeat control block 330 and controlled system 350. An input signal r is input to the basic circuit 300. The input signal r is a periodic function having a cycle L, namely:

$$r(t)=r(t-L). \quad (1)$$

The difference between the input signal r and a feedback signal y is fed as an error signal e into the repeat control block 330. The output of the repeat control block 330 is fed as an output signal v into the controlled system 350. The output of the controlled system 350 is affected by a disturbance d.

Assuming that the cycle L of the input signal r is divided into N time units, as shown in FIG. 2, and the repeat control block generates the output signal v for each time unit, the output signal v at the "k"th time is calculated as follows:

$$v_k(i)=v_{k-1}(i)+e_k(i) \quad (2)$$

where $v_k(i)$ is the output signal at the "k"th time, $v_{k-1}(i)$ is the output signal at the (k−1)th time, $e_k(i)$ is the error signal at the "k"th time, and "i" represents any one of time units 1 through N.

Such a repeat control technique can be preferably adapted to an information reproducing apparatus for reproducing information recorded on an optical disk. In the reproducing apparatus, a control signal is optically read out from the rotating optical disk. This control signal is used for a tracking servo control, a focus servo control, etc. If there is eccentricity of the center hole in the optical disk or warp in the surface of the optical disk, an error occurs in the control signal. The cycle of the occurrence of this error corresponds to the cycle of the rotation of the optical disk. Therefore, the repeat control is suitable for compensating such an error. Concretely, the control signal is input to the repeat control system, and the output signal output from the repeat control system is used for the tracking servo control or the focus servo control.

However, if the repeat control is adapted to the reproducing apparatus, the following problem arises.

If there is a defect or obstruction, such as various defect of the optical disk (e.g. a damage of the information pit), cracks, dusts existing on the optical disk, etc., the control signal is temporarily damaged by the defect or obstruction. The control signal is read out from the optical disk by emitting a light beam to the optical disk and detecting the light beam reflected by the optical disk. Therefore, if there is a defect of the optical disk or an obstruction on the optical disk, the light beam reflected by the optical disk temporarily becomes weak or diffused due to the defect or obstruction. As a result, the control signal is temporarily damaged by the defect or obstruction. Actually, the wave form of the control signal is temporarily distorted due to the defect or obstruction. Such a distorted part of the wave form of the control signal occurs cyclically. However, the distorted part appears only while the light beam is affected by the defect or obstruction. The period that the distorted part appears is relatively short. After the light spot of the light beam has passed at the part that the defect or obstruction exists, the distorted part of the control signal disappears.

If the repeat control performs on the control signal having such a distorted part, the repeat control system recognizes the distorted part of the control signal and memorizes it while the distorted part is appearing. As a result, the influence of the distorted part remains in the output signal output from the repeat control system, after the distorted part of the control signal disappears. Therefore, if such an output signal in which the influence of the distorted part remains is used for the tracking servo control or focus servo control, the accuracy of the tracking servo control or focus servo control become worse.

FIG. 3 shows the control signal to be input to the repeat control system and the output signal output from the repeat control system. In the control signal shown in FIG. 3, the distorted part D1 appears during the period TP. As a result, the output signal is influenced by the distorted part D1, so that the distorted part D2 appears in the output signal. The distorted part D1 of the control signal disappears after the period TP passed. However, the distorted part D2 of the output signal remains after the period TP passed.

SUMMARY OF THE INVENTION

It is therefore an object of the present invention to provide a repeat control apparatus, an information reproduction apparatus and an information recording apparatus, which can prevent that the control signal that is output from a repeat control system is affected by a temporary damage of a control signal that is input to the repeat control system.

The aforementioned object can be achieved by a first repeat control apparatus in accordance with present invention. The repeat control apparatus performs a repeat control on a control signal. The control signal includes control information to be used for controlling reproduction of recording information from a recording medium. The control signal is generated by using a light beam reflected by the recording medium. The repeat control apparatus has: a storage device for storing the control signal; a detecting device for detecting a damaged part of the control signal; a generating device for generating a compensation signal to compensate the damaged part of the control signal; a storing control device for storing the compensation signal, instead of the damaged part of the control signal into the storage device; and a repeat control device for performing the repeat control by using the control signal and the compensation signal stored in the storage device.

The control signal generated by using a light beam reflected by the recording medium is stored into the storage device. When the damaged part of the control signal is detected, the damaged part is not stored into the storage device. Instead of this, the compensation signal is stored into the storage device. The repeat control device performs the repeat control by using the control signal and the compensation signal stored in the storage device. Since the damaged part of the control signal is not stored in the storage device, the influence of the damaged part is eliminated from the repeat control.

The detecting device may detect the damaged part of the control signal on the basis of a reproduction signal. The reproduction signal is generated by using the light beam reflected by the recording medium, and includes reproduction information corresponding to the recording information. Both of the reproduction signal and the control signal are generated at the same time by using the same light beam reflected by the recording medium. If there is a defect of the recording medium or obstruction on the recording medium, both of the reproduction signal and the control signal are damaged. Therefore, the damaged part of the control signal can be detected on the basis of the reproduction signal.

Alternatively, the detecting device may detect the damaged part of the control signal on the basis of a distortion of a wave form of the control signal. If there is a defect of the recording medium or obstruction on the recording medium, the wave form of the control signal is partly distorted. Therefore, the damaged part of the control signal can be detected on the basis of a distortion of a wave form of the control signal.

The generating device may generate the compensation signal on the basis of a first part of the control signal which is located immediately before the damaged part and a second part of the control signal which is located immediately after the damaged part. Therefore, the compensation signal can be generated accurately.

In case where the recording medium is in the shape of a disk, and the control signal is generated by using the light beam reflected by the recording medium when the recording medium is rotating, the generating device may generate the compensation signal on the basis of the control signal generated at least one rotation before the detecting device actually detects the damaged part. Furthermore, in this case, it is desirable that the generating device generates the compensation signal on the basis of: a first part, which is a part of the control signal generated at least one rotation before, and which is located at a rotational angle corresponding to a part of the control signal located immediately before the damaged part; and a second part, which is a part of the control signal generated at least one rotation before, and which is located at a rotational angle corresponding to a part of the control signal located immediately after the damaged part. Therefore, the compensation signal can be generated accurately.

The generating device may generate the compensating signal which connects between a first part of the control signal located immediately before the damaged part and a second part of the control signal located immediately after the damaged part. It is desirable that the level of the compensating signal gradually varies such that the first part and the second part are smoothly connected with each other. Therefore, it can be prevented that the level of the control signal on which the repeat control has been performed suddenly varies.

The aforementioned object can be also achieved by a second repeat control apparatus in accordance with the present invention. The repeat control apparatus performs a repeat control on a control signal. The control signal includes control information to be used for controlling recording of recording information onto a recording medium. The control signal is generated by using a light beam reflected by the recording medium. The repeat control apparatus has: a storage device for storing the control signal; a detecting device for detecting a damaged part of the control signal; a generating device for generating a compensation signal to compensate the damaged part of the control signal; a storing control device for storing the compensation signal, instead of the damaged part of the control signal, into the storage device; and a repeat control device for performing the repeat control by using the control signal and the compensation signal stored in the storage device.

In the second repeat control apparatus, the control signal includes the control information to be used to control recording of the recording information onto the recording medium. This control signal is stored into the storage device. When the damaged part of the control signal is detected, the damaged part is not stored into the storage device. Instead of this, the compensation signal is stored into the storage device. The repeat control device performs the repeat control by using the control signal and the compensation signal stored in the storage device. Since the damaged part of the control signal is not stored in the storage device, the influence of the damaged part is eliminated from the repeat control.

The aforementioned object can be also achieved by an information reproducing apparatus in accordance with the present invention. The information reproducing apparatus is an apparatus for reproducing recording information recorded on a recording medium. The information reproducing apparatus has: a control signal generating device for generating a control signal, which includes control information to be used for controlling reproduction of the recording information, and which is generated by using a light beam reflected by the recording medium; a repeat control apparatus for performing a repeat control on the control signal; a reproduction control device for controlling reproduction of the recording information according to the control information included in the control signal on which the repeat control has been performed; a reproduction signal generating device for generating a reproduction signal, which includes reproduction information corresponding to the recording information, by using the light beam reflected by the recording medium; and a decoding device for decoding the reproduction signal in order to reproduce the reproduction information. The repeat control apparatus has: a storage device for storing the control signal; a detecting device for detecting a damaged part of the control signal; a generating device for generating a compensation signal to compensate the damaged part of the control signal; a storing control device for storing the compensation signal, instead of the damaged part of the control signal, into the storage device; and a repeat control device for performing the repeat control by using the control signal and the compensation signal stored in the storage device.

The aforementioned object can be also achieved by an information recording apparatus. The information recording apparatus is an apparatus for recording recording information onto a recording medium, and has: a control signal generating device for generating a control signal, which includes control information to be used for controlling recording of the recording information, and which is generated by using a light beam reflected by the recording medium; a repeat control apparatus for performing a repeat control on the control signal; a recording control device for controlling recording of the recording information according to the control information included in the control signal on which the repeat control has been performed; and a recording device for recording the recording information onto the recording medium. The repeat control apparatus has: a storage device for storing the control signal; a detecting device for detecting a damaged part of the control signal; a generating device for generating a compensation signal to compensate the damaged part of the control signal; a storing control device for storing the compensation signal instead of the damaged part of the control signal into the storage device; and a repeat control device for performing the repeat control by using the control signal and the compensation signal stored in the storage device.

The nature, utility, and further feature of this invention will be more clearly apparent from the following detailed description with respect to preferred embodiments of the invention when read in conjunction with the accompanying drawings briefly described below.

BRIEF DESCRIPTION OF THE DRAWINGS

FIG. 10 is a diagram showing a construction of a memory installed in the repeat controller;

FIG. 12 is a flowchart showing a replacing process of the second embodiment of the present invention.

DETAILED DESCRIPTION OF THE PREFERRED EMBODIMENTS

Referring to the accompanying drawings, an embodiment of the present invention will be now described. In the description set forth hereinafter, the present invention is adapted to an information reproducing apparatus having a focus servo control mechanism and a PLL circuit for generating a standard reproduction clock signal.

I. First Embodiment

Figure 1:
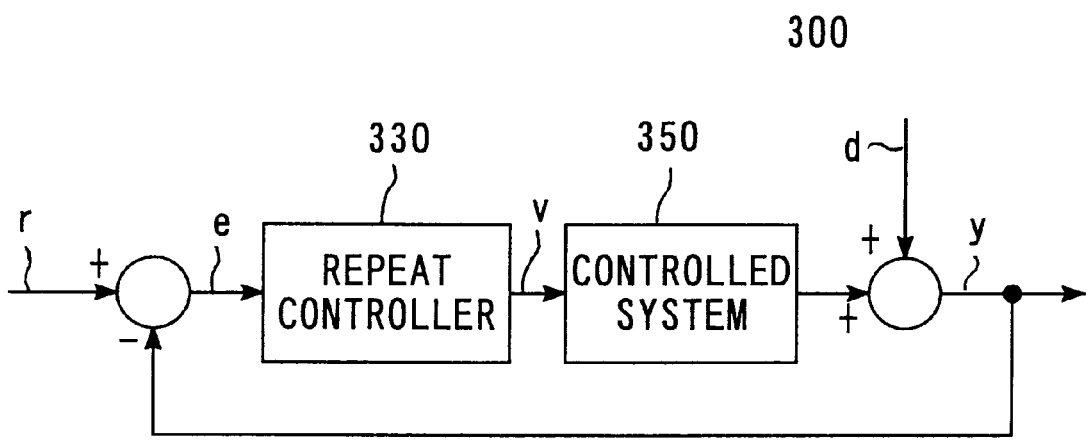
FIG. 1 is a block diagram showing a basic repeat control circuit.
Figure 2:
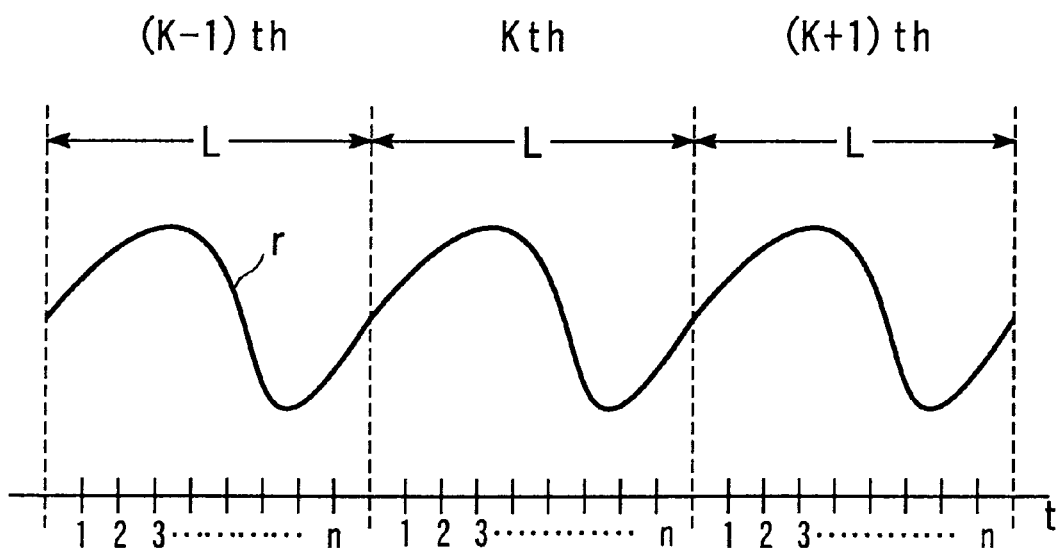
FIG. 2 is a diagram showing an input signal to be used for the repeat control circuit shown in FIG. 1.
Figure 3:
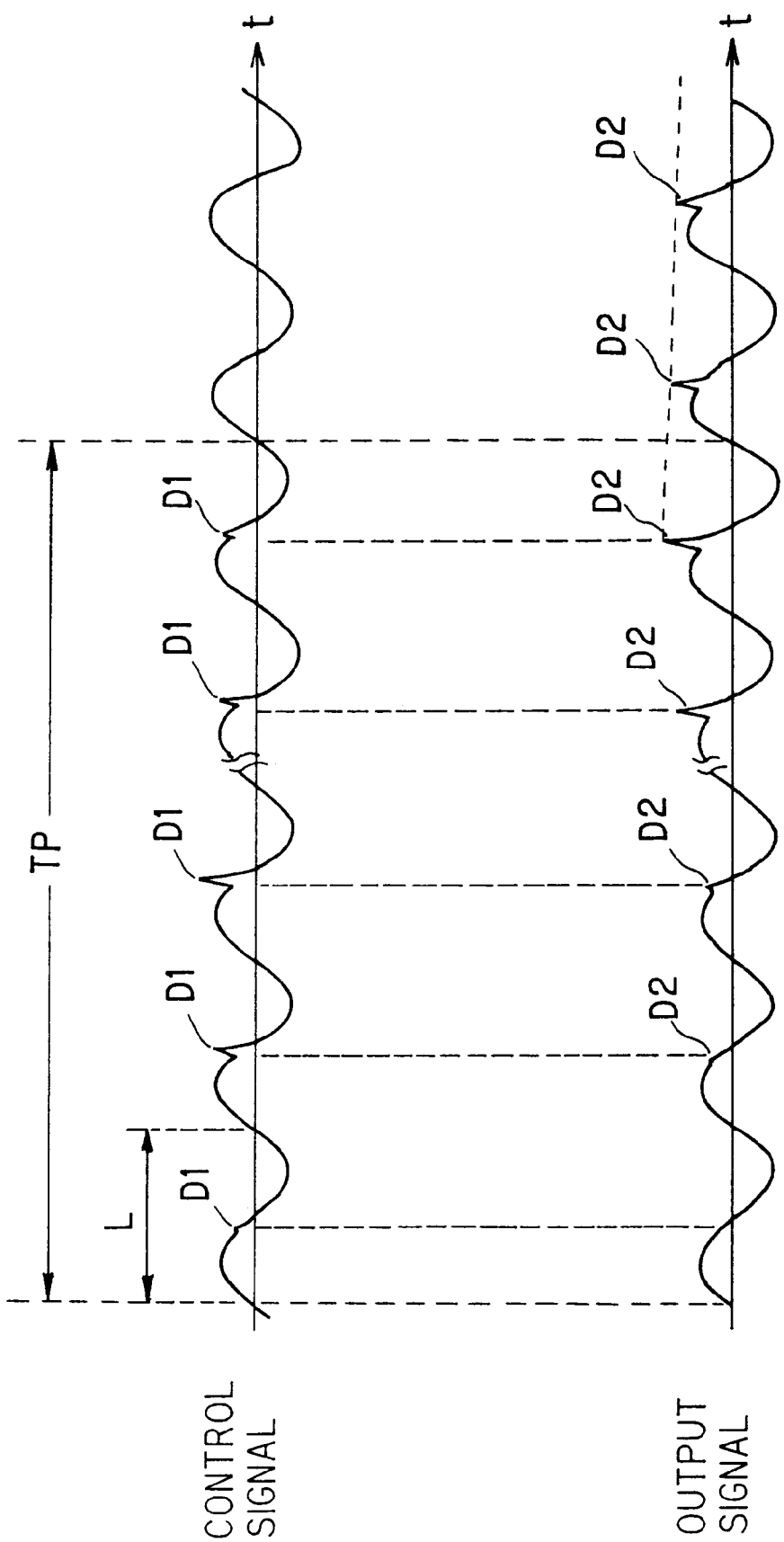
FIG. 3 is a diagram showing an output signal output from the repeat control circuit showing in FIG. 1.
Figure 4:
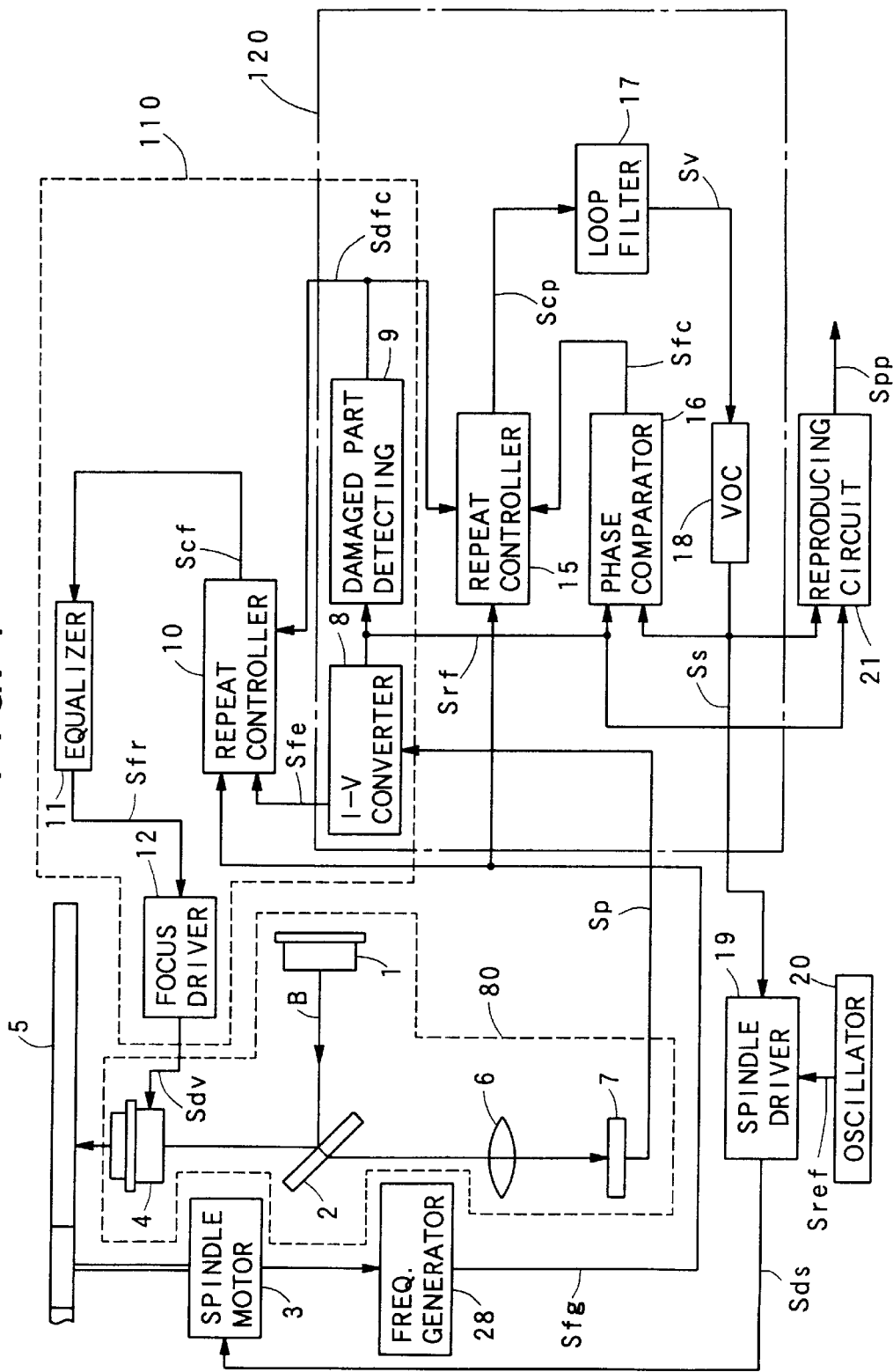
FIG. 4 is a block diagram showing an information reproducing apparatus of a first embodiment of the present invention.

At first, the configuration of an information reproducing apparatus of a first embodiment of the present invention will be explained with reference to FIGS. 4 and 5. FIG. 4 shows only members with regard to the focus servo mechanism and the PLL circuit in the information reproducing apparatus. In addition to these members, the actual information reproducing apparatus has a tracking servo control mechanism to control the spot position of a light beam on the optical disk, but this mechanism is omitted for the sake of clarity of explanation.

As shown in FIG. 4, an information reproducing apparatus 100 of the first embodiment of the present invention is provided with a laser diode 1, a polarization beam splitter 2, a spindle motor 3, an objective lens 4, an optical disk 5, a collective lens 6, a detector 7, a spindle driver 19, a frequency generator 28, a reproducing circuit 21, an oscillator 20, a focus servo circuit 110 and a PLL circuit 120.

The laser diode 1, the polarization beam splitter 2, the objective lens 4, the collective lens 6 and the detector 7 are mounted on a pickup 80.

The focus servo circuit 110 has an I-V (Current-Voltage) converter 8, a damaged part detecting device 9, a repeat controller 10, an equalizer 11 and a focus driver 1 2.

The PLL circuit 120 has the I-V converter 8, the damaged part detecting device 9, a repeat controller 15, a phase comparator 16, a loop filter 17 and a VCO (Voltage Controlled Oscillator) 18.

Figure 5:
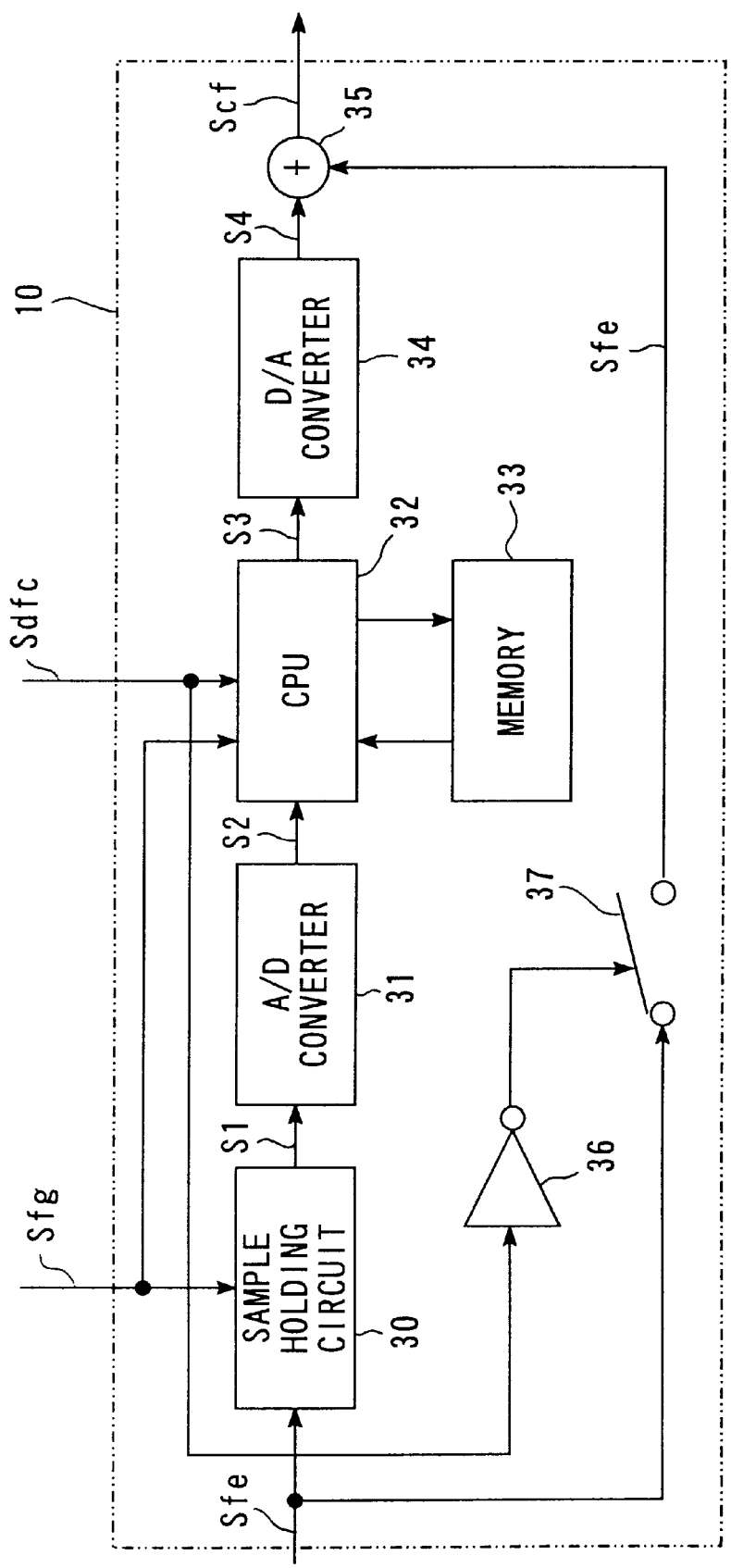
FIG. 5 is a block diagram showing a repeat controller of the first embodiment of the present invention.

Referring to FIG. 5, configurations of the repeat controllers 10 and 15 will be described. The repeat controllers 10 and 15 each have the same configuration basically. Thus, the configuration of the repeat controller 10 is representatively described in FIG. 5.

As shown in FIG. 5, the repeat controller 10 has a sample holding circuit 30, an A/D converter 31, a CPU 32, a memory 33, a D/A converter 34, an adder 35, an inverter 36 and a switch 37.

Referring to FIG. 4, an operation of the information reproducing apparatus 100 will be described.

The laser diode 1 generates a light beam B for information reproduction, and then emits it to the polarization beam splitter 2.

The polarization beam splitter 2 reflects the light beam B, and sends reflected light beam B to the objective lens 4.

The objective lens 4 emits the light beam B onto an information track of the optical disk 5. Information is recorded on the information track as information pits. The objective lens 4 is moved by an actuator connected with the objective lens 4 (which is not depicted) in the perpendicular direction of the surface of the optical disk 5 (i.e. focus servo control direction). Therefore, the focal point of the light beam B (i.e. the position of the light spot in the focus servo control direction) is adjusted in such way that the light beam B is focused on the information track. As described later, the actuator is driven according to a driving signal Sdv supplied from the focus driver 12.

Moreover, at this time, the optical disk 5 is being rotated by the spindle motor 3 at a predetermined rotational frequency according to a spindle control signal Sds.

The light beam B reflected by the information track is modulated in intensity in accordance with the information (i.e pits) recorded on the optical disk 5, and its polarization surface is rotated. This light beam B includes reproduction information corresponding to the information recorded on the optical disk 5. The reproduction RF signal to be used for reproduction is generated on the basis of this light beam B. Furthermore, this light beam B includes various control information. The various control signal, such as the focus error signal to be used for the focus servo control, the tracking error signal to be used for the tracking servo control, a basic signal to be used for generating the standard reproduction clock signal, etc., are also generated on the basis of this light beam B.

This light beam B passes through the objective lens 4 and the polarization beam splitter 2, and it is collected on a light receiving surface of the detector 7 by the collective lens 6. At this time, if an astigmatism method is used as a method of generating a focus error signal, the collective lens 6 gives astigmatism to the light beam B.

Other than the astigmatism method, for example, a spot-size method, a knife-edge method or the like may be used as the method of generating the focus error signal.

The detector 7 generates a detection signal Sp corresponding to the intensity of the received light beam B, and then outputs it to the I-V converter 8. Actually, the light receiving surface of the detector 7 is divided into four parts, and four detection signals corresponding to the four parts are generated. The detection signal Sp is generated by using these four detection signals.

On the basis of the detection signal Sp, the focus servo circuit 110 generates the drive signal Sdv, and then outputs it to the focus actuator. The focus actuator is driven according to the drive signal Sdv. Thus, the focus servo control is carried out.

The PLL circuit 120 generates a standard reproduction clock signal Ss serving as the standard clock to reproduce the information recorded on the optical disk 5, on the basis of the detection signal Sp.

The reproducing circuit 21, on the basis of the standard reproduction clock signal Ss, performs a reproducing process. Concretely, the reproducing circuit 21 decodes a reproduction RF signal Srf supplied from the I-V converter 8, and performs an error correction process. The reproduction RF signal is generated by the I-V converter 8 by using the detection signal Sp, and it corresponds to the information recorded on the optical disk 5. Then, the decoded reproduction RF signal Srf is output as a reproduction signal Spp from the reproducing circuit 21.

On the other hand, the standard reproduction clock signal Ss generated by the PLL circuit 120 is also output to the spindle driver 19. The spindle driver 19 generates the spindle control signal Sds by using the standard reproduction clock signal Ss. More concretely, the spindle driver 19 is coupled to the oscillator 20. The oscillator 20 has a crystal oscillator, and generates a clock signal Sref having a standard frequency of the rotational frequency of the spindle motor 3. The clock signal Sref is fed into the spindle driver 19 from the oscillator 20. If the rotational frequency of the spindle motor 3 is correct, the standard reproduction clock signal Ss coincides with the clock signal Sref. Therefore, the spindle driver 19 generates the spindle control signal Sds in such a way that the standard reproduction clock signal Ss coincides with the clock signal Sref. As a result, the rotational frequency of the spindle motor 3 is correctly adjusted according to the spindle control signal Sds.

Figure 6:
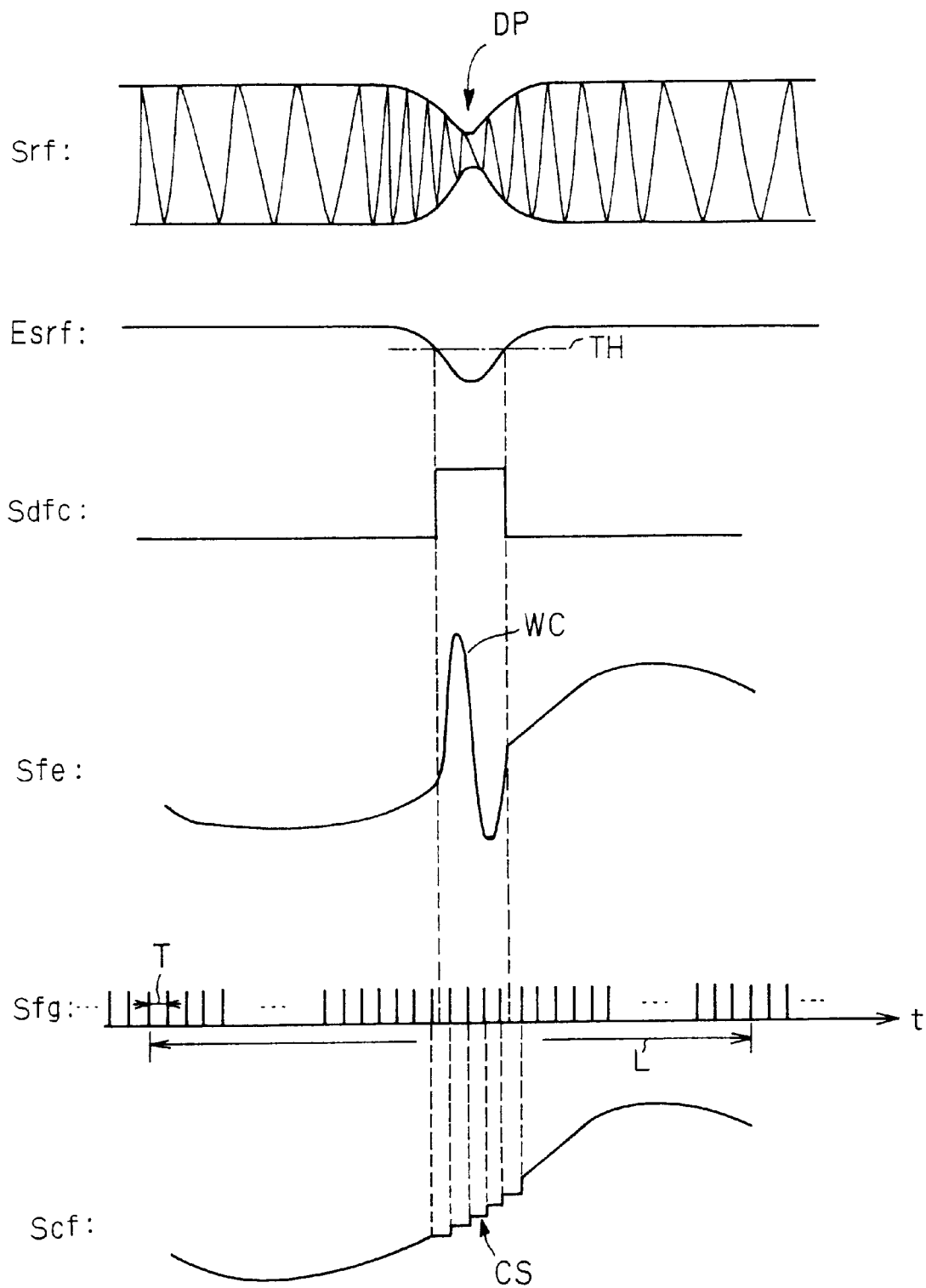
FIG. 6 is a diagram showing a reproduction RF signal, an envelope of the reproduction RF signal, a damage detection signal, a focus error signal, a frequency signal, and a repeat signal.

While the above mentioned processes are being carried out, the frequency generator 28 generates a frequency signal Sfg. The frequency signal Sfg is a pulse signal, and synchronized with the rotation of the spindle motor 3 (i.e. rotation of the optical disk 5). In the frequency signal Sfg, the interval of the pulses is constant and the number of pulse per one rotation of the optical disk 5 is constant. For example, the frequency signal Sfg has 36 pulses per one rotation of the optical disk 5. The frequency signal Sfg is shown in FIG. 6. In FIG. 6, "L" represents a time period of one rotation of the optical disk 5. "T" represents the interval between the adjacent pulses of the frequency signal Sfg. The frequency signal Sfg is fed from the frequency generator 28 into the focus servo circuit 110 and the PLL circuit 120.

Referring to FIGs.4 and 6, operations of the focus servo circuit 110 will be described.

In the focus servo circuit 110, the I-V converter 8 generates the reproduction RF signal Srf corresponding to the information recorded on the optical disk 5, on the basis of the detection signal Sp, and then outputs it to the damaged part detecting device 9. The I-V converter 8 also generates a focus error signal Sfe indicative of a deviation of the focal point of the light beam B from the information track in the focus servo control direction, based on the detection signal Sp, and outputs it to the repeat controller 10.

In order to generate the reproduction RF signal Srf and the focus error signal Sfe, the detector 7 is divided into the four parts as mentioned above. The reproduction Rf signal Srf is generated on the basis of the signal that is the sum of the respective detection signals obtained from the divided light receiving surfaces. On the other hand, the focus error signal Sfe is generated by the astigmatism method, and concretely generated by using the difference between the signals, each of which is the sum of the detection signals obtained from the two light receiving surfaces located opposite to each other among the divided four light receiving surfaces.

If there is a defect or obstruction, such as various defect of the optical disk (e.g. a damage of the information pit), cracks, dusts existing on the optical disk, etc (Hereinafter, such a defect or obstruction is referred to as a "defect".), the reproduction RF signal Srf includes a damaged part DP resulting from the defect, as shown in FIG. 6. In order to detect the damaged part DP, the damaged part detecting device 9 firstly generates the envelope Esrf of the reproduction RF signal Srf. As shown in FIG. 6, the voltage of the envelope Esrf decreases at the damaged part DP. The damaged part detecting device 9 secondly generates a damage detection signal Sdfc on the basis of the envelope Esrf. The damage detection signal Sdfc is a signal for identifying the damaged part DP clearly. The voltage of the damage detection signal Sdfc becomes high only while the damaged part DP exists in the reproduction RF signal Srf (Hereinafter, this period is referred to as "a damaged period"). The damage detection signal Sdfc is fed into a repeat controller 10.

In the damaged period, the focus error signal Sfe is sharply distorted, as shown in FIG. 6. Of course, this is caused by the defect. Hereinafter, this part is referred to as a "wave distortion part WC".

Next, operations of the repeat controller 10 will be described with reference to FIG. 5.

The frequency signal Sfg, the damage detection signal Sdfc and the focus error signal Sfe are input to the repeat controller 10. The repeat controller 10 performs the repeat control on the focus error signal Sfe by using the frequency signal Sfg, and then generates a repeat signal Scf. As shown in FIG. 5, the repeat signal Scf is added to the original focus error signal Sfe, and then, the resultant signal is supplied to the equalizer 11.

More concretely, the repeat controller 10 samples and holds (i.e. performs the so called "sample-hold") the focus error signal Sfe at a timing when each pulse of the frequency signal Sfg is input to the repeat controller 10, and then converts this sampled focus error signal Sfe into a digital signal. Next, the repeat controller 10 accumulates in the memory 33 each digital value of the focus error signal Sfe converted into the digital signal. Accordingly, the focus error signal Sfe input to the repeat controller 10 is sequentially stored in the memory 33 as the digital values. For example, if the frequency signal Sfg has 36 pulses while the optical disk 5 makes one rotation, the digital value of the focus error signal Sfe for each rotational angle in which the optical disk 5 is divided into 36 equal parts in its circumference direction is accumulated in the memory 33.

At the same time, the repeat controller 10 reads out from the memory 33 the digital value corresponding to the focus error signal Sfe input before at least one rotation of the optical disk 5. Then, the repeat controller 10 performs a predetermined calculation (which is shown at step 9 in FIG.

7) by using the previous focus error signal Sfe which is read out from the memory 33 and current focus error signal Sfe which has been now input to the repeat controller 10. Then, the repeat controller 10 converts the value resulting from this calculation into the repeat signal Scf. This repeat signal Scf is added to the original focus error signal Sfe, and the resultant signal is output to the equalizer 11, as shown in FIG. 5. The repeat controller 10 repeatedly executes the aforementioned reading-out process, calculation and conversion each time the pulse of the frequency signal Sfg is input to the repeat controller 10.

Figure 7:
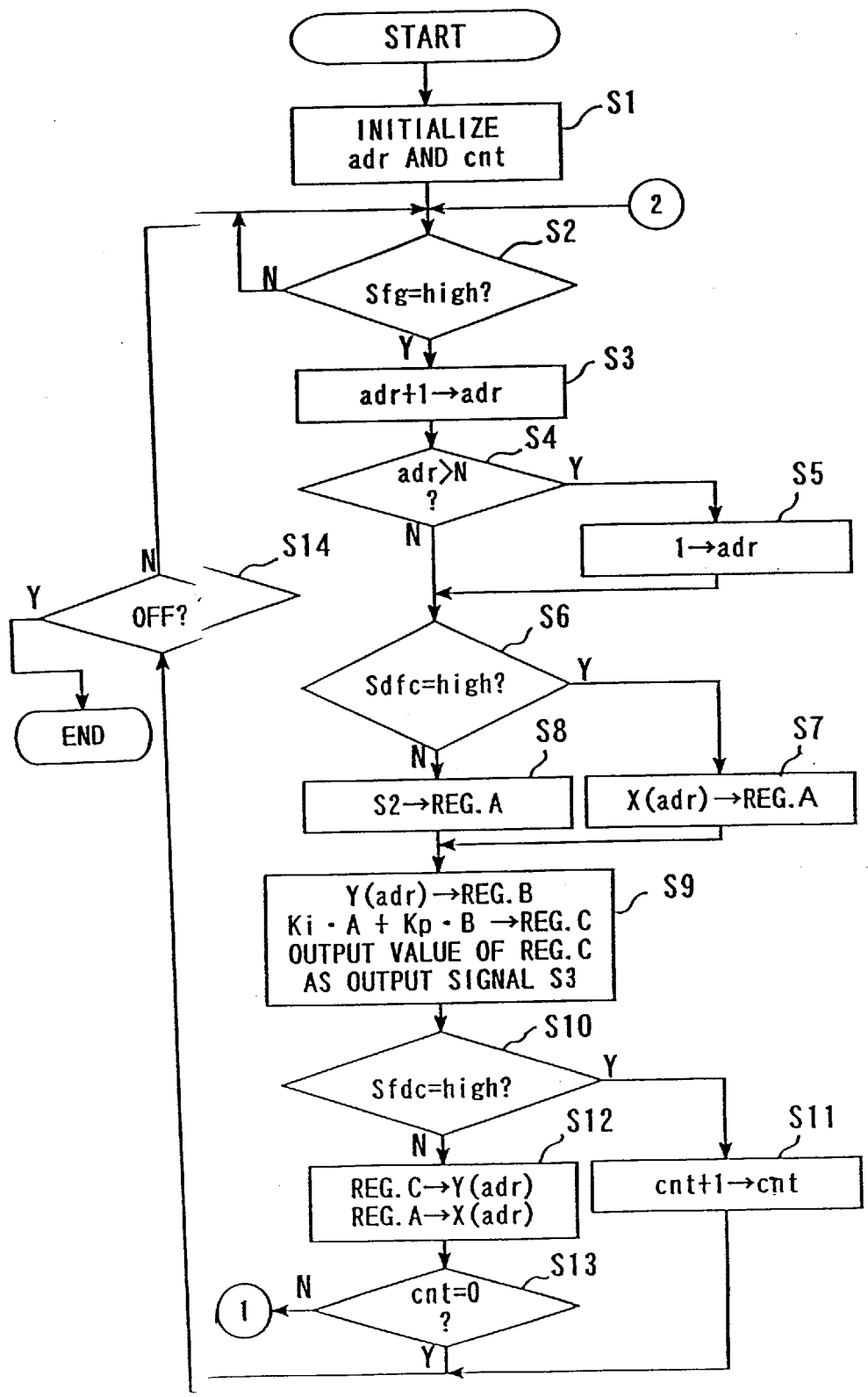
FIG. 7 is a flowchart showing a repeat control process of the first embodiment of the present invention.
Figure 8:
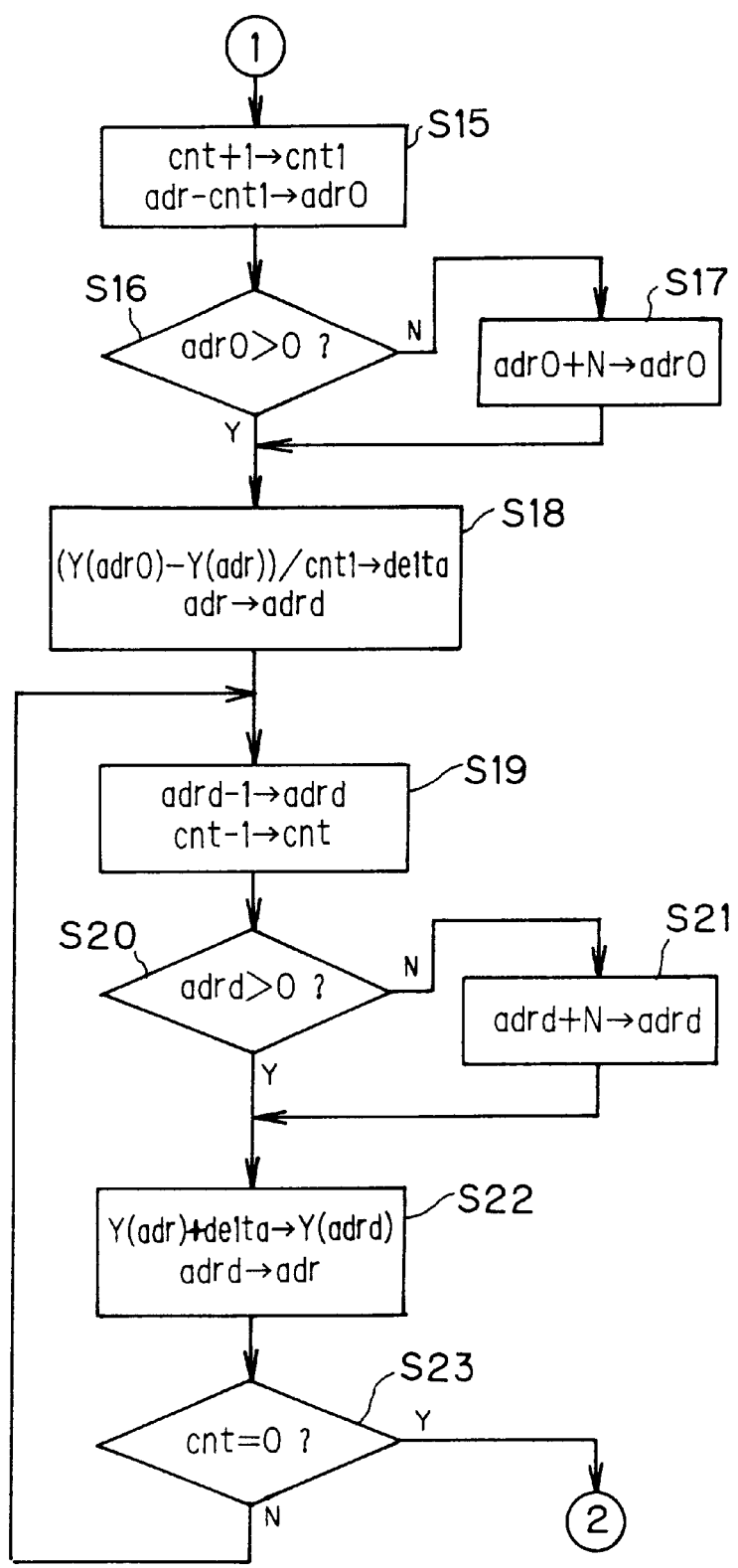
FIG. 8 is a flowchart showing a replacing process of the first embodiment of the present invention.

In the damaged period, the wave distortion part WC appears in the focus error signal Sfe, as shown in FIG. 6. When the focus error signal Sfe having such a wave distortion part WC is input to the repeat controller 10, the repeat controller 10 executes a replacing process. The flowchart in FIG. 8 shows the replacing process. The replacing process is called while the repeat control process shown in FIG. 7 is being carried out.

In the replacing process, a compensation signal CS is generated in order to eliminate the wave distortion part WC. As shown in FIG. 6, although the focus error signal Sfe has a wave distortion part WC, this wave distortion part WC disappears in the repeat signal Scf. In the repeat signal Scf, the wave distortion part WC has been replaced by a compensation signal CS whose voltage gradually increases like stairs. The replacing process will be described in detail later. The repeat signal Scf including the compensation signal CS is output to the equalizer 11. In addition, as the switch 37 is open during the damaged period, the original focus error signal Sfe is not added to the repeat signal Scf during the damaged period.

The equalizer 11 compensates the frequency property of the repeat signal Scf. The compensated repeat signal is output as a focus control signal Sfr from the equalizer 11 to the focus driver 12.

The focus driver 12 drives the focus actuator (not shown) fixed to the objective lens 4, on the basis of the focus control signal Sfr, and then generates the drive signal Sdv of carrying out the focus servo control.

Next, operations of the PLL circuit 120 will be described with reference to FIGS. 4 and 6.

In the PLL circuit 120, the I-V converter 8 generates the reproduction RF signal Srf on the basis of the detection signal Sp, and then outputs it to the damaged part detecting device 9, the phase comparator 16 and the reproducing circuit 21. This reproduction RF signal Srf is generated on the basis of the signal which is the sum of the respective detection signals from the divided light receiving surfaces in the detector 7, as mentioned above.

The damaged part detecting device 9 generates the envelope of the reproduction RF signal Srf, as mentioned above, and then generates the damage detection signal Sdfc, and further outputs it to the repeat controller 15.

The phase comparator 16 compares the phase of the reproduction RF signal Srf with that of the standard reproduction clock signal Ss supplied from the VCO 18, and then outputs a comparison signal Sfc, which is a phase difference between the respective signals, to the repeat controller 15.

Operations of the repeat controller 15 will be described. Similarly to the repeat controller 10, the repeat controller 15 performs the repeat control on the comparison signal Sfc by using the frequency signal Sfg and the damage detection signal Sdfc, and then generates the repeat signal Scp. This repeat signal Scp is added to the original comparison signal Sfc, and the resultant signal is output to the loop filter 17.

More concretely, the repeat controller 15 accumulates the values of the comparison signal Sfc in the memory at a timing when each pulse of the frequency signal Sfg is input. At the same time, the repeat controller 15 reads out from the memory the values corresponding to the comparison signal Sfc input before at least one rotation of the optical disk 5, and then perform the predetermined calculation by using the previous comparison signal Sfc which is read out from the memory and the current comparison signal Sfc which has been now input to the repeat controller 15. In this manner, the repeat controller 15 generates the repeat signal Scp. This repeat signal Scp is added to the original comparison signal Sfc, and the resultant signal is output to the loop filter 17.

Like the focus error signal Sfe, the wave distortion part appears in the comparison signal Sfc in the damaged period. When the comparison signal Sfc having such a wave distortion part is input to the repeat controller 15, the repeat controller 15 executes the replacing process. By the replacing process, the wave distortion part of the comparison signal Sfc is replaced by a compensation signal CS whose voltage gradually increases like stairs. The replacing process will be described in detail later. The repeat signal Scp including the compensation signal CS is output to the loop filter 17. In addition, as the switch 37 is open during the damaged period, the original comparison signal Sfc is not added to the repeat signal Scp during the damaged period.

Next, the loop filter 17 averages the voltage signals Scp, and then outputs a voltage signal Sv to the VCO 18.

On the basis of the voltage signal Sv, the VCO 18 generates the standard reproduction clock signal Ss, and then outputs it to the phase comparator 16 for the sake of feedback, and further outputs it to the reproducing circuit 21 and the spindle driver 19.

After that, the reproducing circuit 21 uses the standard reproduction clock signal Ss and the reproduction RF signal Srf, and then generates the above mentioned reproduction signal Spp.

On the other hand, the spindle driver 19 generates the above mentioned spindle control signal Sds in such a way that the frequency and the phase of the standard reproduction clock signal Ss respectively coincide with those of the above mentioned clock signal Sref.

Referring to FIGS. 5 and 7, the repeat control process will be described in detail. The same repeat control process is performed in both the repeat controllers 10 and 15. Hereinafter, the repeat control process performed in the repeat controller 10 will be described.

As shown in FIG. 5, the frequency signal Sfg is input to the sample holding circuit 30 and the CPU 32 of the repeat controller 10. The frequency signal Sfg has 36 pulses per one rotation of the optical disk 5, as mentioned above. The sample holding circuit 30 samples and holds the focus error signal Sfe at the timing that each pulse of the frequency signal Sfg is input to the sample holding circuit 30, and outputs a hold signal S1 to the A/D converter 31. The A/D converter 31 converts the hold signal S1 into a digital hold signal S2, and outputs it to the CPU 32.

In addition, the focus error signal Sfe is also input to the switch 37 through the inverter 36. The operation of the switch 37 is controlled according to the inverted focus error signal Sfe. Concretely, when the focus error signal Sfe is "high", the output of the inverter 36 is "low", and therefore, the switch 37 is open. On the other hand, when the focus error signal Sfe is "low", the output of the inverter 36 is "high", and therefore, the switch 37 is closed. Accordingly, the focus error signal Sfe is distorted by the defect, the switch 37 is open. As a result, the original focus error signal Sfe is not added to the repeat signal Scf (i.e., an output signal S4) by the adder 35. On the other hand, the focus error signal Sfe is not distorted by the defect, the original focus error signal Sfe is added to the repeat signal Scf by the adder 35.

The CPU 32 executes the repeat control process which is shown as the flowchart in FIG. 7. In addition, one cycle of the repeat control process (step 2 through 14) is carried out since the one pulse of the frequency signal Sfg is input to the repeat controller 10 before the next pulse of the frequency signal Sfg is input. That is to say, the repeat control process is repeatedly carried out each time the pulse of the frequency signal Sfg is input.

As shown in FIG. 7, in this repeat control process, two parameters "adr" and "cnt" are used. The parameter adr is used for counting the pulses of the frequency signal Sfg. Concretely, the parameter adr is always increased one by one each time the pulse of the frequency signal Sfg is input to the CPU 32. Since the frequency signal Sfg has 36 pulses per one rotation of the optical disk 5, the parameter adr is increased from 1 to 36. However, when the parameter adr becomes more than 36, the CPU 32 sets "1" into the parameter adr. As a result, the parameter adr circulates 1 through 36.

The parameter cnt is used for counting the pulses of the frequency signal Sfg during the damaged period. That is, only while the damaged period, the parameter cnt is increased one by one in response to the input of the pulse of the frequency signal Sfg.

When the reproducing apparatus 100 is turned on, the CPU 20 sets "0" into both parameters adr and cnt to initialize respective parameters (step 1).

Next, the CPU 32 detects the input of the pulse of the frequency signal Sfg. Actually, the CPU 32 determines whether or not the frequency signal Sfg is "high" (step 2). While the pulse is not input to the CPU 32, the CPU 32 waits for the input of the pulse. When the pulse is input to the CPU 32, the CPU 32 increases the parameter adr by one (step 3).

Next, the CPU 32 determines Whether or not the parameter adr has exceeded the maximum number N, i.e., 36 (step 4). If the parameter adr has exceeded 36, the CPU 32 sets "1" into the parameter adr (step 5).

Next, the CPU 32 determines whether or not the focus error signal Sfe which is now input to the repeat controller 10 is damaged by the defect. Actually, the CPU 32 determines whether or not the damage detection signal Sdfc is "high" (step 6).

When the damaged detection signal Sdc is "low", the CPU 32 receives the current digital hold signal S2 from the A/D converter 31, and sets this digital hold signal S2 into a register A (step 8). The register A is installed in the CPU 32.

When the damage detection signal Sdfc is "high", the CPU 32 reads out the previous digital hold signal S2 from the memory 33, and sets this digital value into the register A (step 7).

Figure 10:
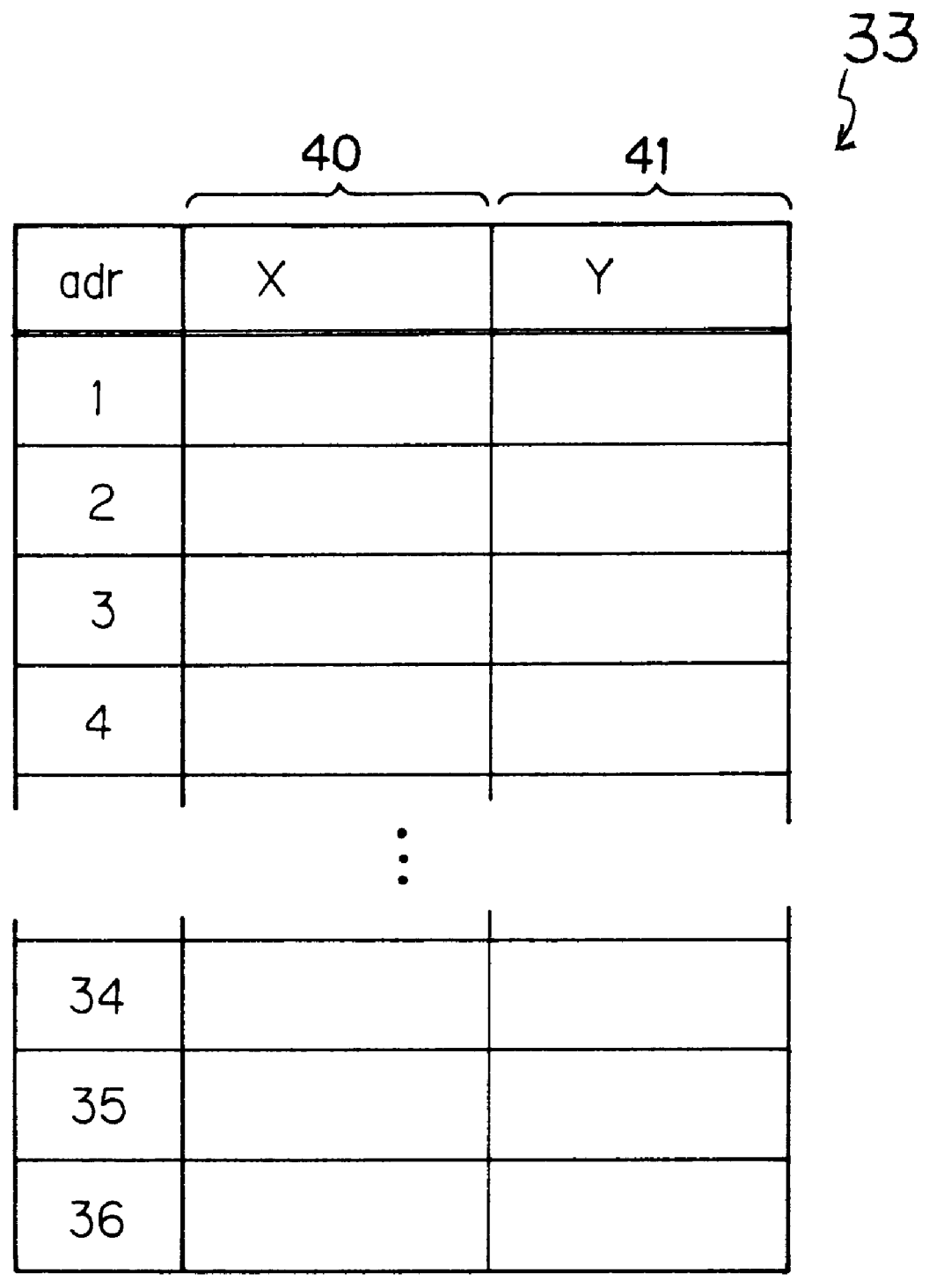

The memory 33 stores the newest previous digital hold signals S2 among the digital holding digital signals S2 that are previously supplied to the CPU 32 when the focus error signal Sfe is not distorted by the defect. As shown in FIG. 10, these previous digital hold signals S2 are stored at the X-area 40 of the memory 33. As mentioned above, the frequency signal Sfg has 36 pulses per one rotation of the optical disk 5, and therefore the sample holding circuit 30 outputs the hold signals S1 36 times per one rotation of the optical disk 5, and thus the A/D converter 31 outputs the digital hold signals S2 36 times per one rotation of the optical disk 5. These 36 digital hold signals S2 corresponding to one rotation of the optical disk 5 are stored into the X-area 40 of the memory 33.

The CPU 32 can select one of the 36 previous digital hold signals S2 stored in X-area 40 according to the parameter adr. In step 7, the CPU 32 selects the specified previous digital hold signals S2 stored in X-area 40 by referring to the current parameter adr, and reads out it from X-area 40, and then sets it to the register A.

The memory 33 also stores the newest previous output signals S3 among the output signals S3 that are previously output from the CPU 32 to the D/A converter 35 when the focus error signal Sfe is not distorted by the defect. As shown in FIG. 10, these previous output signals S3 are stored at the Y-area 41 of the memory 33. The CPU 32 outputs the output signal S3 36 times per one rotation of the optical disk 5. These 36 output signals S3 corresponding to one rotation of the optical disk 5 are stored into the Y-area 41 of the memory 33.

The CPU 32 can select one of the 36 previous output signals S3 stored in Y-area 4-1 according to the parameter adr.

In the next step 9, the CPU 32 selects the specified previous output signal S3 stored in Y-area 41 by referring to the current parameter adr, and reads out it from Y-area 41, and then sets it to a register B installed in the CPU 32.

Next, at this step, the CPU 32 performs the following calculation by using the values set in the registers A and B, and sets the resultant value "c" into a register C installed in the CPU 32.

$$c = Kp \times b + Ki \times a \quad (3)$$

where "a" is the value set in the register A, "b" is the value set in the register B, "Ki" is an integral gain, and "Kp" is a value representing a response property in the repeat control. Concretely, the "Kp" is given as:

$$Kp = e^{-WpL} \quad (4)$$

where "L" is the period corresponding to one cycle of the rotation of the optical disk 5, and "Wp" is a coefficient corresponding to a cutoff frequency in case that it is assumed that the whole of the right side of the aforementioned equation (3) is a transfer function of a low pass filter. The coefficients Kp and Ki are constant while the CPU 32 is being carried out.

Next, at this step, the CPU 32 outputs the value "c" set in the register C to the D/A converter 35 as the output signal S3.

In addition, the coefficient Kp is 0<Kp<1. As the coefficient Kp approaches "0", the output signal S3 is generated by mainly using the digital hold signal S2 corresponding to the focus error signal Sfe that currently input to the repeat controller 10. In contrast, as the coefficient Kp approaches "1", the output signal S3 is generated by mainly using the previous output signal S3 stored in the memory 33. If the coefficient Kp approaches "1", the previous output signals S3, such as the previous output signal S3 corresponding to the past rotations (including one and more than one rotations before), are reflected in the generation of the current output signals S3. In this manner, the repeat control is carried out on the basis of the equation (3).

Furthermore, the CPU 32 executes either step 7 or 8 depending on whether or not the focus error signal Sfe is distorted by the defect. If the focus error signal Sfe is not distorted, the digital hold signal S2 corresponding to the current rotation of the optical disk 5 is set into the register A (step 8). If the focus error signal Sfe is distorted, the previous digital hold signal S2 corresponding to the one rotation before is set into the register A (step 7).

At the next step 10, the CPU 32 determines whether or not the damage detection signal Sdfc is "high". This result is the same as that at step 6.

If the damage detection signal Sdfc is "high", the CPU 32 increases the parameter cnt by one (step 11). If the damage detection signal Sdfc is "low", the CPU 32 sets the value of the register C into the Y-area 41 and further sets the value of the register A into the X-area 40 according to the current parameter adr (step 12). Thus, if the focus error signal Sfe is not distorted by the defect, the digital hold signal S2 and the output signal S3 corresponding to the current rotation of the optical disk 5 are stored in the memory 33.

Next, the CPU 32 determines whether or not the parameter cnt is "0" (step 13). If the parameter cnt is "0", the process proceeds to step 14. This means that there is no wave distortion in the focus error signal Sfe by the defect. If the parameter cnt is not "0", a replacing process shown in FIG. 8 is carried out.

In step 14, the CPU 32 determines whether or not the reproducing apparatus 100 is turned off. If not so, the aforementioned steps is repeatedly carried out, as shown in FIG. 7.

In this repeat control process shown in FIG. 7, if the focus error signal Sfe is not distorted by the defect, the CPU 32 carries out the normal repeat control by using the digital hold signal S2 which corresponds to the current rotation of the optical disk 5 and the previous output signal S3 which corresponds to the past rotations (including one and more than one rotations before), and generates the output signal S3 that corresponds to the current rotation of the optical disk 5 (steps 8 and 9). Furthermore, if the focus error signal Sfe is not distorted by the defect, both of the values set in the registers A and C are stored into the X-area 40 and Y-area 41 of the memory 33, respectively (step 12).

In contrast, if the focus error signal Sfe is distorted by the defect, the CPU 32 carries out the different process from the normal repeat control. When the focus error signal Sfe is distorted, the CPU 32 generates the output signal S3 by using the previous digital hold signal S2 stored in the X-area 40 of the memory 33 and the previous output signal S3 stored in the Y-area 41 of the memory 33 (steps 7 and 9). That is to say, when the focus error signal Sfe is distorted, the CPU 32 does not use the digital hold signal S2 corresponding to the current rotation of the optical disk 5 (i.e., the digital hold signal S2 that has been now input to the repeat controller 10). Furthermore, if the focus error signal Sfe is distorted, neither the value set in the register A nor the value set in the register C is stored into the memory 33.

Referring to FIG. 8, the replacing process will be described. The replace process is executed by the CPU 32, when the CPU 32 determines that the parameter cnt is not "0" at step 13 in the repeat control process shown in FIG. 7. The replacing process is a process of generating digital values to construct the compensation signal CS and storing the generated digital values in the Y-area 41 of the memory 33. As shown in FIG. 6, the compensation signal CS connects between the part of the repeat signal Scf immediately before the damaged period and the part of the repeat signal Scf immediately after the damaged period. The voltage of the compensation signal CS gradually varies such that the parts immediately before and after the damaged period are smoothly connected with each other.

In the replacing process shown in FIG. 8, the CPU 32 firstly increases the parameter cnt by one, and substitutes the resultant value for a variable "cnt1". Next, the CPU 32 subtracts the variable cnt1 from the parameter adr, and substitutes the resultant value for a variable "adr0" (step 15).

At step 16, the CPU 32 determines whether or not the adr0 is more than "0". If not so, the CPU 32 adds the maximum number N (i.e. 36) to the adr0 (step 17).

At step 18, the CPU 32 reads out the previous output signal S3 that is designated by the adr0 from Y-area 41 of the memory 33, and further reads out the previous output signal S3 that is designated by the adr from Y-area 41. Then, the CPU 32 calculates by using the following formula.

$$(Y(adr0)-Y(adr))/cnt1 \quad (5)$$

where "Y(adr0)" is the previous output signal S3 that is. designated by the adr0, and "Y(adr)" is the previous output signal S3 that is designated by the adr. Then, the CPU 32 substitutes the value resulting from this calculation for a variable "delta". Next, the CPU 32 substitutes the current adr for a variable "adrd".

At step 19, the CPU 32 decreases the adrd by one, and further decreases the cnt by one.

At step 20, the CPU 32 determines whether or not the adrd is more than "0". If not so, the CPU 32 adds the maximum number N to the adrd (step 21).

At step 22, the CPU 32 reads out from the Y-area 41 the previous output signal S3 that is designated by the adr, and calculates by using the following formula.

$$Y(adr)+delta \quad (6)$$

where "Y(adr)" is the previous output signal S3 that is designated by the adr. Then, the CPU 32 stores the value resulting from this calculation to the Y-area 41 that is designated by the adrd. Therefore, the value previously stored in the Y-area 41 that designated by the adrd is replaced by the value resulting from this calculation. Next, the CPU 32 substitutes the adrd for the adr.

At step 23, the CPU 32 determines whether or not the cnt is equal to "0". If so, the replacing process ends, and step 2 in the repeat control shown in FIG. 7 is continuously carried out. If not so, step 19 in the replacing control in FIG. 8 is continuously carried out.

Figure 9:
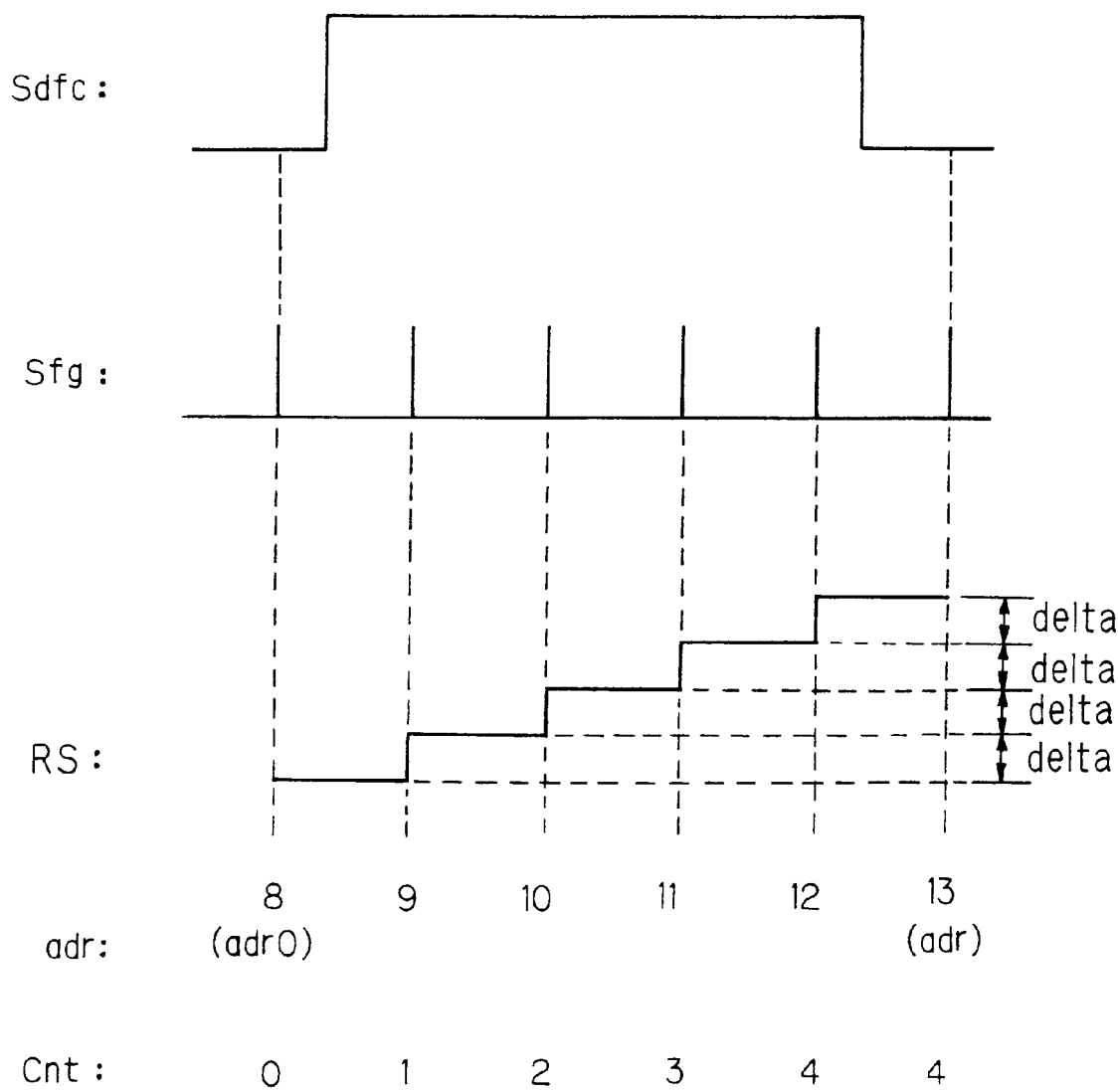
FIG. 9 is a diagram showing the damage detection signal, the frequency signal and a compensation signal.

Referring to FIGS. 8 and 9, the replacing process will be further concretely described.

For example, the focus error signal Sfe is distorted by the defect while the parameter adr is 9 through 12. As seen from FIG. 9, while the parameter adr is 9 through 12, the damage detection signal Sdfc is "high", and the parameter cnt increases from 1 to 4.

In this case, the repeat control is executed when the frequency signal Sfg is input to the CPU 32 immediately after the damage detection signal Sdfc becomes "low" (i.e., when step 10=NO, and step 13=NO). At this stage, the parameter adr is "13", and the parameter cnt is "4".

Firstly, the CPU 32 carries out the step 15. As a result, the cnt1 is "5", and the adr0 is "8". As seen from FIG. 9, the adr0 means the parameter adr immediately before the focus error signal Sfe is distorted by the defect.

Next, the CPU 32 carries out the steps 16 and 17. As a result, if the adr0 is not more than "0", the adr0 is converted to the corresponding value with in the range of 1 to 36.

Next, the CPU 32 carries out the step 18. As a result, the previous output signal S3 immediately before the focus error signal Sfe is distorted and the previous output signal S3 immediately after the focus error signal Sfe is distorted are read out from Y-area 41 of the memory 33. Next, the difference between both the previous output signals S3 is calculated. Next, this difference is divided by the cnt1. Consequently, the "delta" is calculated. As seen from FIG. 9, the delta is a unit of amount that the compensation signal CS gradually increases.

Next, the CPU 32 repeatedly carries out the steps 19 through 23 until the cnt becomes "0". In this repetition, the values to create the compensation signal CS shaped like stairs are generated and stores into Y-area 41 of the memory 33.

These values stored in the Y-area 41 are used in the repeat control process immediately.

Thereafter, the output signal S3 output from the CPU 32 is converted into the analog output signal S4 by the D/A converter 34. Then, the analog output signal S4 is added to the original focus error signal Sfe only if the focus error signal Sfe is not distorted by the defect, and the resultant signal is output as the repeat signal Scf.

Thus, the part of the repeat signal Scf corresponding to the damaged period has been compensated, and the influence of the wave distortion part WC has been eliminated from the repeat signal Scf, as shown in FIG. 6.

In addition, in the repeat controller 15 of the PLL circuit 120, the same repeat control process and replacing process are performed on the comparison signal Sfc.

According to the reproducing apparatus 100 of the first embodiment of the present invention, while the focus error signal Sfe or the comparison signal Sfc is being distorted by the defect, the digital hold signal S2 is not stored into the memory 33. As a result, the wave distortion part WC of the focus error signal Sfe or the comparison signal Sfc is not used in the repeat control process. Thus, if the focus error signal Sfe or the comparison signal Sfc is temporarily distorted by the defect, such as a damage of the information pit, cracks, dusts existing on the optical disk, etc., the temporary distorted part of the focus error signal Sfe or the comparison signal Sfc is not reflected in the repeat control. Therefore, the influence of the distorted part does not remain in the repeat signal Scf or Scp output from the repeat controller 10 or 15 after the distorted part of the focus error signal Sfe or the comparison signal Sfc disappears. Accordingly, the accuracy of the focus servo control and the generation of the standard reproduction clock signal Ss can be improved.

Furthermore, according to the reproducing apparatus 100 of the first embodiment of the present invention, when the focus error signal Sfe or the comparison signal Sfc is distorted, the compensation signal CS is generated by using the previous output signals S3 stored in the Y-area 41 corresponding to immediately before and after the damaged period. Therefore, the focus error signal Sfe or the comparison signal Sfc can be compensated accurately.

Furthermore, in the reproducing apparatus 100, the previous output signals S3 corresponding to the past rotations (including one and more than one rotations before) are used to generate the compensation signal CS. Therefore, the focus error signal Sfe or the comparison signal Sfc can be compensated correctly.

Moreover, according to the reproducing apparatus 100, the focus error signal Sfe or the comparison signal Sfc is compensated by using the compensation signal CS whose voltage gradually varies like stairs. Therefore, it can be prevented that the voltage of the focus error signal Sfe or the comparison signal Sfc (i.e. the voltage of the repeat signal Scf) is suddenly changed.

II. Second Embodiment

Figure 11:
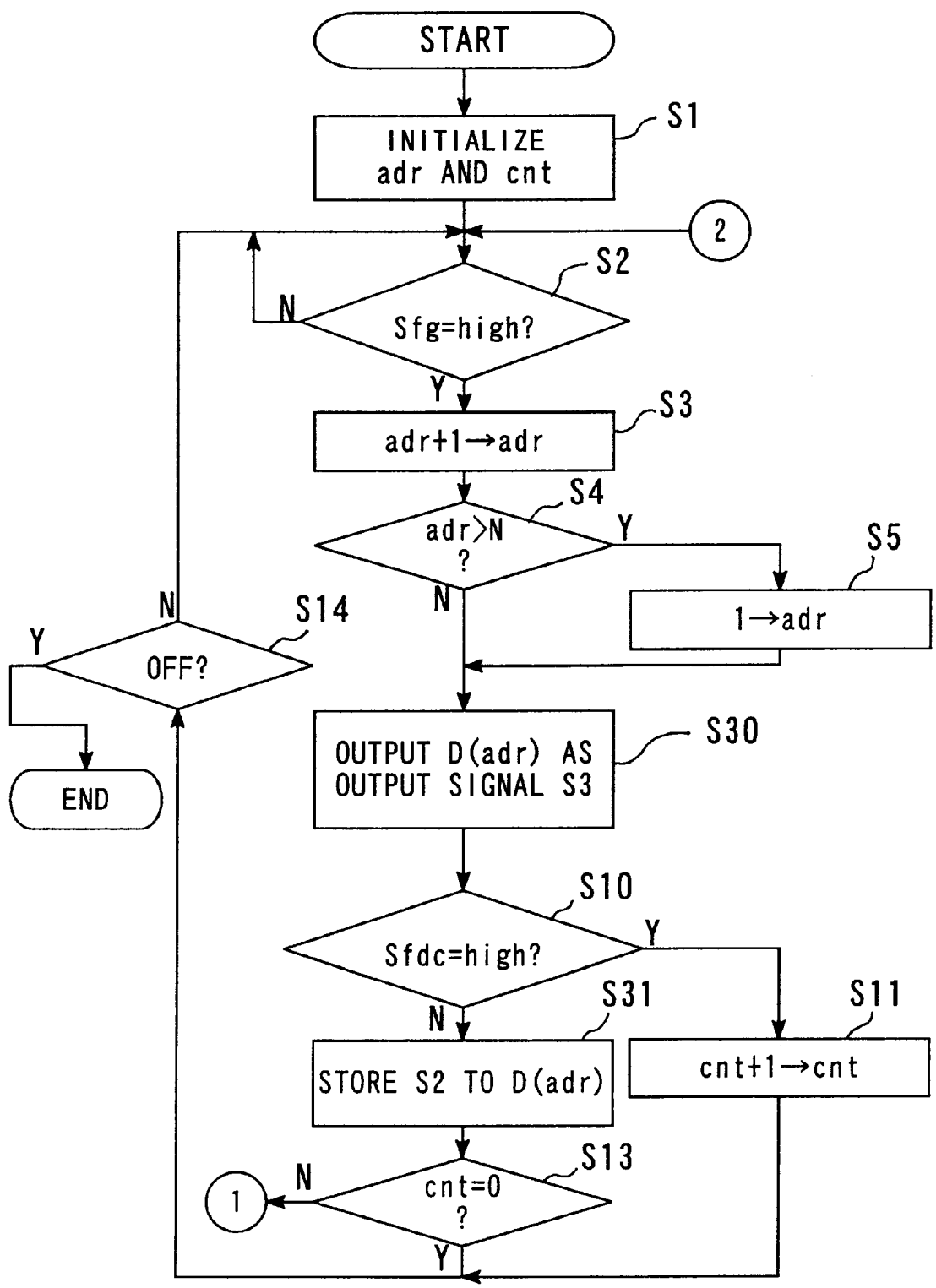
FIG. 11 is a flowchart showing a repeat control process of a second embodiment of the present invention.

Referring to FIGS. 11 and 12, a second embodiment of the present invention will be described.

The repeat control process carried out by the reproducing apparatus of the second embodiment of the present invention is different from the aforementioned repeat control process. In the aforementioned repeat control process, the repeat control is carried out by using the previous output signal corresponding to not only one rotation before but also more than one rotations before. In contrast, in the repeat control process of the second embodiment, the repeat control is carried out by using the previous output signal corresponding to only one rotation before.

In addition, in FIGS. 11 and 12, the same steps as those in FIGS. 7 and 8 carry the same reference numbers.

Furthermore, the construction of the reproducing apparatus of the second embodiment is the same as that of the reproducing apparatus 100 of the first embodiment except for the memory installed in the repeat controller. The arrangement of the areas of the memory installed in the repeat controller of the second embodiment is different from that of the memory 33 of the first embodiment. Although the memory 33 of the first embodiment has two areas, namely X-area 40 and Y-area 41, the memory installed in the repeat controller of the second embodiment has one memory area, namely a D-area. In the D-area, the newest previous digital hold signals S2 among the digital holding digital signals S2 that are previously supplied to the CPU 32 when the focus error signal Sfe is not distorted by the defect is stored.

In addition, one cycle of the repeat control process is carried out since the one pulse of the frequency signal Sfg is input to the repeat controller 1 0 before the next pulse of the frequency signal Sfg is input. Furthermore, the number of the pulse of the frequency signal Sfg is 36 per one rotation of the optical disk 5.

As shown in FIG. 11, the CPU installed in the repeat controller in the focus servo circuit of the second embodiment carries out the steps 1 through 5.

Next, the CPU, at step 30, reads out from the D-area the previous digital hold signal S2 that designated by the parameter adr. Then, the CPU outputs the previous digital hold signal S2 as the output signal S3.

Next, the CPU determines whether or not the damage detection signal Sdfc is "high" (step 10). If so, the CPU increases the parameter cnt by one (step 11), and continuously carries out step 14.

On the other hand, the damage detection signal Sdfc is "low", the CPU stores the digital hold signal S2 that has been now input to the repeat controller into the D-area according to the parameter adr (step 31).

Next, the CPU determines whether or not the parameter cnt is "0" (step 13). If so, the CPU continuously carries out step 14. If not so, the CPU carries out the replacing process shown in FIG. 12 in order to generate the compensation signal CS.

In this repeat control process, the digital hold signal S2 before one rotation of the optical disk 5 is always output as the output signal S3. And, if the focus error signal Sfe is distorted by the defect, the replacing process is carried out.

Referring to FIG. 12, the replacing process will be described. The replacing process of the second embodiment is basically the same as that of the first embodiment. In the replacing process of the second embodiment, the compensation signal CS to be used to connect the parts of the repeat signal Scf immediately before and after the damaged period is generated. The voltage of the compensation signal CS gradually varies like stairs.

As shown in FIG. 12, the CPU installed in the repeat controller increases the parameter by one, and substitutes the resultant value for the variable cnt1. Next, the CPU subtracts the cnt1 from the parameter adr, and substitutes the resultant value for the variable adr0 (step 15). Next, the CPU determines whether or not the adr0 is more than "0", and if not so, the CPU adds the maximum value N to the adr0. At this stage, the adr0 designates the time point immediately before the damaged period, and the adr designates the time point immediately after the damaged period.

At step 32, the CPU calculates by using the following formula.

$$(D(adr0) - D(adr))/cnt1 \quad (7)$$

where "D(adr0)" is the previous digital hold signal S2 stored in the D-area that designated by the adr0, and "D(adr)" is the previous digital holding signal S2 stored in the D-area that designated by the adr. Then, the CPU substitutes the resultant value for the "delta". Then, the CPU substitutes the adr for the variable adrd.

Next, the CPU decreases the adrd by one, and decreases the cnt by one (step 19). Next, the CPU determines whether or not the adrd is more than "0", and if not so, the CPU adds the maximum value N to the adrd (step 21).

At step 33, the CPU calculates by using the following formula.

$$D(adr) + delta \quad (8)$$

where "D(adr)" is the previous digital hold signal stored in the D-area that is designated by the adr. Then, the CPU stores the resultant value into the D-area that is designated by the adrd. Then, the CPU substitutes the adrd for the adr.

Next, the CPU determines whether or not the cnt is "0" (step 23). If so, the CPU continuously carries out step 2 in FIG. 11. If not so, the CPU continuously carries out step 19 in FIG. 12. Then, steps 19, 20, 21, 33 and 23 are repeatedly carried out until the cnt becomes "0".

Thus, the digital values to create the compensation signal CS are stored in the D-area. These digital values is used for the repeat control process for the next rotation of the optical disk. As a result, the repeat signal Scf having the compensation signal CS whose voltage gradually varies is generated. Accordingly, the influence of the damage caused by the defect can be eliminated.

In addition, the repeat control of the second embodiment may be also carried out by the repeat controller in the PLL circuit.

In the replacing process of the second embodiment, the compensation signal CS is generated by the focus error signal Sfe or the comparison signal Sfc corresponding to one rotation before. This is based on the fact that there is a strong relation between a focus error signal Sfe or the comparison signal Sfc at the current rotation and that at the last rotation if the rotational angle is the same each other. In other words, the replacing process uses the fact that the undulation of the information track and the deviation of the surface accuracy of the optical disk 5 are not sharply changed in the period of the one rotation (that is, for one information track).

In addition, in the aforementioned embodiments, the fact that the focus error signal Sfe is distorted by the defect is determined on the basis of the damaged part DP of the reproduction RF signal Srf. However, the wave distortion part WC may be directly detected. This detection is achieved by adding a detecting means between the I/V converter 8 and the repeat controller 10 in FIG. 4.

Moreover, in the above mentioned embodiment, the case is described in which the present invention is applied to the focus servo circuit 110 and the PLL circuit 120 in the information reproducing apparatus 100. The present invention is not limited to this. For example, the present invention can be applied to the tracking servo control to the optical disk 5 (for example, the tracking servo control using a three-beam method, a push-pull method or a DPD (Differential Phase Detection) method).

In this case, as for the tracking error signal generated in the occurrence period of the damaged part, the above mentioned compensation signal is generated on the basis of the tracking error signals corresponding to the parts immediately before and after the damaged part among the tracking error signals detected prior to at least one rotation of the optical disk 5.

Furthermore, in the above mentioned embodiment, the case is described in which the present invention is applied to the focus servo control and the generation of the standard reproduction clock signal Ss performed by the PLL circuit 120 when the reproducing operation is carried out by the information reproducing apparatus 100. The present invention is not limited to this. For example, the present invention can be applied to an information recording apparatus which has a recording device for emitting a light beam onto an optical disk, while modulating the light beam according to the information to be recorded onto the optical disk, and which records the information while performing the focus servo control or the tracking servo control on an optical disk. Furthermore, the present invention can be applied to an information recording and reproducing apparatus which records and reproduces the information while performing the focus servo control or the tracking servo control.

In this case, the reproduction RF signal Srf is not generated when the information is recorded. Hence, it is necessary to detect the wave distortion part of the tracking error signal or the focus error signal directly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-354521 filed on Dec. 24, 1997 including the specification, claims, drawings and summary is incorporated herein by reference in its entirety.

What is claimed is:

1. A repeat control apparatus for performing a repeat control on a control signal, said control signal including control information to be used for controlling reproduction of recording information from a recording medium on which said recording information is recorded, said control signal being generated by using a light beam reflected by said recording medium, said repeat control apparatus comprising:

a storage device for storing said control signal;

a detecting device for detecting a damaged part of said control signal;

a generating device for generating a compensation signal to compensate said damaged part of said control signal;

a storing control device for storing said compensation signal, instead of said damaged part of said control signal, into said storage device; and a repeat control device for performing said repeat control by using said control signal and said compensation signal stored in said storage device.

2. A repeat control apparatus according to claim 1, wherein said detecting device detects said damaged part of said control signal on the basis of a reproduction signal, which is generated by using said light beam reflected by said recording medium, and which includes reproduction information corresponding to said recording information.

3. A repeat control apparatus according to claim 1, wherein said detecting device detects said damaged part of said control signal on the basis of a distortion of a wave form of said control signal.

4. A repeat control apparatus for performing a repeat control on a control signal, said control signal including control information to be used for controlling recording of recording information onto a recording medium, said control signal being generated by using a light beam reflected by said recording medium, said repeat control apparatus comprising:

a storage device for storing said control signal;

a detecting device for detecting a damaged part of said control signal;

a generating device for generating a compensation signal to compensate said damaged part of said control signal;

a storing control device for storing said compensation signal, instead of said damaged part of said control signal, into said storage device; and a repeat control device for performing said repeat control by using said control signal and said compensation signal stored in said storage device.

5. A repeat control apparatus according to claim 1, wherein said generating device generates said compensation signal on the basis of a first part of said control signal which is located immediately before said damaged part and a second part of said control signal which is located immediately after said damaged part.

6. A repeat control apparatus according to claim 1, wherein said recording medium is in a shape of a disk, said control signal is generated by using said light beam reflected by said recording medium when said recording medium is rotating, and said generating device generates said compensation signal on the basis of said control signal generated at least one rotation before said detecting device actually detects said damaged part.

7. A repeat control apparatus according to claim 6, wherein said generating device generates said compensation signal on the basis of: a first part, which is a part of said control signal generated at least one rotation before, and which is located at a rotational angle corresponding to a part of said control signal located immediately before said damaged part; and a second part, which is a part of said control signal generated at least one rotation before, and which is located at a rotational angle corresponding to a part of said control signal located immediately after said damaged part.

8. A repeat control apparatus according to claim 1, wherein said compensating signal connects between a first part of said control signal which is located immediately before said damaged part and a second part of said control signal which is located immediately after said damaged part.

9. A repeat control apparatus according to claim 8, wherein a level of said compensating signal gradually varies such that said first part and said second part are smoothly connected with each other.

10. An information reproducing apparatus for reproducing recording information recorded on a recording medium, comprising:

a control signal generating device for generating a control signal, which includes control information to be used for controlling reproduction of said recording information, and which is generated by using a light beam reflected by said recording medium;

a repeat control apparatus for performing a repeat control on said control signal;

a reproduction control device for controlling reproduction of said recording information according to said control information included in said control signal on which said repeat control has been performed;

a reproduction signal generating device for generating a reproduction signal, which includes reproduction information corresponding to said recording information, by using said light beam reflected by said recording medium; and a decoding device for decoding said reproduction signal in order to reproduce said reproduction information, wherein said repeat control apparatus comprises:

a storage device for storing said control signal;

a detecting device for detecting a damaged part of said control signal;

a generating device for generating a compensation signal to compensate said damaged part of said control signal;

a storing control device for storing said compensation signal, instead of said damaged part of said control signal, into said storage device; and a repeat control device for performing said repeat control by using said control signal and said compensation signal stored in said storage device.

11. An information reproducing apparatus according to claim 10, wherein said control signal is a tracking error signal to be used for controlling a spot position of said light beam on said recording medium, and said reproduction control device comprises a tracking servo control device for controlling said spot position of said light beam according to said tracking error signal.

12. An information reproducing apparatus according to claim 10, wherein said control signal is a focus error signal to be used for controlling a focal point of said light beam on said recording medium, and said reproduction control device comprises a focus servo control device for controlling said focal point of said light beam according to said focus error signal.

13. An information reproducing apparatus according to claim 10, wherein said reproduction control device comprises a standard reproduction clock signal generating device for generating a standard reproduction clock signal according to said control signal, and said standard reproduction clock signal serves as a standard clock to reproduce said recording information.

14. An information recording apparatus for recording recording information onto a recording medium, comprising:

a control signal generating device for generating a control signal, which includes control information to be used for controlling recording of said recording information, and which is generated by using a light beam reflected by said recording medium;

a repeat control apparatus for performing a repeat control on said control signal;

a recording control device for controlling recording of said recording information according to said control information included in said control signal on which said repeat control has been performed; and a recording device for recording said recording information onto said recording medium, wherein said repeat control apparatus comprises:

a storage device for storing said control signal;

a detecting device for detecting a damaged part of said control signal;

a generating device for generating a compensation signal to compensate said damaged part of said control signal;

a storing control device for storing said compensation signal, instead of said damaged part of said control signal, into said storage device; and a repeat control device for performing said repeat control by using said control signal and said compensation signal stored in said storage device.

\* \* \* \* \*